United States Patent Office 2,697,090
Patented Dec. 14, 1954

2,697,090

CATALYST AND METHOD

Eduard Farber, Washington, D. C., assignor to Timber Engineering Company, Washington, D. C., a corporation of Delaware No Drawing. Application November 18, 1952, Serial No. 321,290

4 Claims. (Cl. 260—71)

This invention relates to maleic acid-containing catalysts useful to effect the setting of adhesives comprising urea-formaldehyde resins; to processes entailing the utilization of such catalysts in the production of laminated wood products, the plies of which are bonded together with urea-formaldehyde resin adhesives; and to the laminated wood products thereby obtained.

It is known that intermediate condensates of urea and formaldehyde are convertible into the final stages of resinification by catalysts of acid function. Efforts of the art to capitalize on this property of the urea-formaldehyde resins, through utilization thereof as cold-setting glues in the production of laminated wood structures, have been fraught with problems for which no satisfactory solution was heretofore known.

Many factors mitigate against the successful utilization of acid catalyzed urea-formaldehyde resin adhesives in the manufacture of wood laminates. A particularly acute problem resides in the provision of a physiologically innocuous catalyst capable of setting or converting such urea-formaldehyde resin glues with a rapidly requisite to commercial utilization thereof which does not attack and materially weaken the wood structure.

It is essential to the commercial production of wood laminates that the urea-formaldehyde resin adhesive utilized set to a degree such that the laminated structure can be removed from the clamps or presses after a relatively short clamping or pressing period. In general up to about 20 minutes of clamping or pressing time may be tolerated in commercial operation.

It has been the experience of the art that to achieve the desired rate of cold-setting of urea-formaldehyde resin adhesives, only strong mineral acid such as hydrochloric acid, sulfuric acid, nitric acid and the like, and organic acids in unduly high concentration, may be employed.

Strong mineral acids are unsuitable for the production of wood laminates for the reason that such acids weaken the wood structure surrounding the resin-wood bond. Furthermore, such mineral acids, over a period of time, tend to impart increasing brittleness to the resin bond per se and hence shorten unduly the satisfactory period of performance of the laminated structure.

Many organic acids, in high concentration, likewise attack and weaken the wood structure or have otherwise proved unsatisfactory in the art. For example, formic acid, when present in effective concentration, is objectionable by virtue of the high degree of vaporization resulting therefrom, and the consequent unfavorable physiological effects of the vapor produced. Many non-volatile organic acids present solubility problems and the like, which render the utilization thereof impractical as catalysts for urea-formaldehyde resin adhesives to be utilized in wood laminating operations. Catalyst compositions embracing organic acids in high concentration have further presented problems relative to the spreadability of the catalyst or adhesive composition, the extendability of such compositions with water and conventional solid fillers and the like, which have not been solved by the prior art.

It is a primary object of this invention to provide a commercially practical method of formulating wood laminates entailing the utilization of cold-setting urea-formaldehyde resin adhesives.

It is a further primary and salient object of this invention to provide a catalyst, having no material adverse effect on the wood structure, through the utilization of which urea-formaldehyde resin adhesives may be set within a time requisite to the commercial utilization thereof in the production of wood laminates.

Applicant has discovered that the function of a catalyst in effecting the setting or conversion of urea-formaldehyde resin adhesives is not dependent solely upon the relative strength as an acid of the catalyst utilized, but also upon the structure of the organic acid molecule employed as the catalyst.

In accordance with the present invention, it has been discovered that wood laminates may commercially be produced through the utilization of cold-setting urea-formaldehyde adhesives, there being employed to catalyze the setting of such resin adhesives an aqueous solution containing from about 10% to about 20% by weight of maleic acid.

It will be appreciated by those skilled in the art that from an economic standpoint it might be undesirable to ship catalyst solutions containing the relatively small amounts of maleic acid which are requisite to the practice of this invention. To obviate the economic problem stemming from the presence of large quantities of water in the compositions of this invention, it is contemplated to provide catalyst concentrates which may be diluted by the ultimate user to the appropriate maleic acid concentration. Such maleic acid concentrates may desirably embrace aqueous solutions containing from about 20% to about 40% by weight of maleic acid.

In Table I are recorded comparative data illustrative of the unusual and unexpected properties of maleic acid to effect conversion of urea-formaldehyde resin adhesives through the final stage of resinification. The data appearing in Table I were obtained by dispersing 5 grams of intermediate stage urea-formaldehyde resin in 2 grams of water and thereafter incorporating, with agitation, the acid catalysts listed, in the concentrations indicated. In each instance the agitation was continued so long as permitted by the increasing viscosity of the mixture. The urea-formaldehyde resin utilized was the product of the reaction of urea and formaldehyde in a mole ratio of about 1:1 to about 1:2, at a temperature of about 150° F., for about 90 minutes, in the presence of a catalyst. It was a commercial product sold by the Rohm and Haas Company, under the trade name of "Urea Resin 500."

TABLE I

[Conversion of intermediate urea-formaldehyde resin glue by catalysts added to 5 grams of glue in 2 grams of water]

| Catalyst | | | | | Time in Seconds for— | | |
|---|---|---|---|---|---|---|---|
| Name of Acid | Concentration, percent used | Milligrams used | Millimoles used | Milliequivalent | Start of gelation | Soft set | Hard set |
| Maleic | 7.6 | 76 | 0.66 | 1.32 | 120 | 240 | 480 |
| Do | 11.5 | 115 | 1.0 | 2.0 | 50 | 70 | 480 |
| Do | 23 | 230 | 2.0 | 4.0 | 25 | 45 | 300 |
| Hydroxyacetic | 20 | 200 | 2.6 | 2.6 | 600 | | |
| Do | 50 | 500 | 6.6 | 6.6 | 300 | | |
| Lactic | 5 | 100 | 1.1 | 1.1 | 1,500 | | |
| Do | 10 | 200 | 2.2 | 2.2 | 600 | | |
| Do | 20 | 500 | 5.5 | 5.5 | 240 | | |
| Lactic and Maleic | 20 / 4 | 200 / 20 | 2.2 / 0.17 | 2.2 / .34 | 180 | 420 | |
| Malic | 20 | 200 | 1.5 | 3.0 | 570 | 900 | |
| Do | 40 | 400 | 3.0 | 6.0 | 100 | 210 | 1,500 |
| Tartaric | 10 | 100 | 0.66 | 1.98 | 780 | | 1,500 |
| Do | 10 | 200 | 1.3 | 3.9 | 300 | | |
| Do | 10 | 240 | 1.6 | 4.8 | 180 | 90 | |
| Citric | 20 | 200 | 1.0 | 3.0 | 500 | 1,000 | |
| Boric | 12 | 240 | | | (¹) | (¹) | (¹) |

¹ No action after 20 hours.

It will be observed from Table I that maleic acid in dilute aqueous solution is characterized by the unusual and unexpected property of effecting extremely rapid setting of urea-formaldehyde resin adhesives. No one of the other acids listed in Table I is comparable in effect to maleic acid, even though utilized in concentrations requisite to provide a hydrogen ion concentration many times greater than that provided by the maleic acid employed.

The unusual effectiveness of maleic acid in converting urea-formaldehyde resin adhesives is of major significance in the art of wood lamination. In general, through the practice of this invention, laminated wood structures bonded with urea-formaldehyde resins may be removed from the clamps after only about 10 minutes. Clamping for about 10 to about 30 minutes is preferred. In consequence thereof, cold-setting urea-formaldehyde resin glues may practically be employed in the commercial production of laminated wood structures. By virtue of the extremely rapid rate of setting, the time required to effect initial setting of the adhesive to a degree requisite that the laminated structure may be removed from the clamps, is materially reduced and the total output of the laminating plant thereby increased.

It is the hypothesis of applicant, that the unusual and specific properties of maleic acid as a catalyst to effect the setting or conversion of urea-formaldehyde resin adhesives, are attributable in large measure to the unsaturation inherent in the maleic acid molecule.

Wood laminates formulated in accordance with the method of this invention demonstrate no objectionable degree of weakening or degradation of the wood structure. The maleic acid utilized as a catalyst has no material adverse effect upon the strength of the ultimate laminated product produced, even after long periods of time.

In Table II are recorded data obtained by subjecting to shear tests, carried out in conformance with ASTM specification D9050-49 entitled "Test for Strength Properties of Adhesives in Shear by Compression Loading," hard maple blocks glued together in accordance with the method of this invention. The samples tested were obtained by gluing together hard maple blocks having the dimensions of ¾" x 2½" x 12". The so-glued blocks were then cut to conform to the dimensions of 2" x 2" x ¾". Samples having these latter dimensions were utilized in carrying out the test. The blocks were glued together by applying to one of the surfaces to be joined a urea-formaldehyde resin adhesive of the type described with reference to Table I, in about 66% concentration by weight, as an aqueous dispersion, and applying to the other surface to be joined an aqueous solution of maleic acid containing about 15% by weight of maleic acid, and thereafter joining the two so-coated surfaces and maintaining the joined surfaces in clamps under a pressure of about 100 to 250 lbs. per square inch for a period of about 10 minutes at a temperature of about 70° F. The data recorded in Table II are average data, resulting from the tests of twenty such blocks. The tests were carried out in a Baldwin-Southwark testing machine.

TABLE II

| Conditioning Time One Week | | Conditioning Time One Month | |
|---|---|---|---|
| Ultimate Shear Stress, p. s. i. | Wood Failure, Percent | Ultimate Shear Stress, p. s. i. | Wood Failure, Percent |
| 3,184 | 83 | 3,120 | 84 |

In Table III are recorded like data resultant from tests similar to those described with reference to Table II, but relating to western white pine, red gum, white oak test blocks, with the exception that in this case the catalyst employed comprised a 10% solution of maleic acid in water, and the test blocks were maintained in the clamps for a period of 10 minutes. Likewise, in the case of Table III, the data reflects the average results from five test blocks.

TABLE III

| Conditioning Time | Average Shear Stress, p. s. i. | Average Wood Failure, Percent |
|---|---|---|
| Western white pine: | | |
| 1 week | 840 | 49 |
| 1 month | 808 | 9 |
| Red gum: | | |
| 1 week | 1,647 | 70 |
| 1 month | 1,661 | 48 |
| 6 months | 2,086 | 43 |
| White oak: | | |
| 1 week | 1,664 | 31 |
| 1 month | 1,800 | 33 |

It is apparent from the data recorded in Tables II and III that the maleic acid catalyst compositions of this invention do not adversely weaken or degrade the wood structure of the wood plies, laminated in accordance with the invention, to any material extent.

It is critical to this invention that the maleic acid be utilized in aqueous solution in a concentration of from about 10% to about 20% by weight. If the lower limit of 10% by weight is not observed, the concentration of maleic acid is ineffective to effect conversion of the urea-formaldehyde resin adhesives in a time requisite to commercial utilization thereof in the production of wood laminates. If the concentration of the maleic acid materially exceeds the upper limit of about 20% by weight in the catalyst solution, the acidity thereof may be such as to adversely affect the quality of the laminated wood product.

A salient feature of this invention resides in the incorporation into the maleic acid catalyst composition of from about 0.2% to about 2.0% by weight of a methyl cellulose having a specific viscosity range of from about 400 to about 4,000 centipoises. In the catalyst concentrates of this invention, methyl cellulose may desirably be present in an amount equal to from about 0.4% to about 2% of the weight thereof.

It has been discovered that the presence of methyl cellulose in the catalyst composition renders the composition useful for all species of wood which it may be desired to laminate. Wood surfaces vary greatly in permeability and surface texture. Unmodified aqueous solutions of maleic acid may, in many instances, penetrate too rapidly into certain species of wood or types of wood surface with the result that an unsatisfactory bond is obtained. Exemplary of woods which may be penetrated with undue rapidity are southern yellow pine, basswood, and certain oaks. Through the utilization of methyl cellulose in conjunction with the maleic acid catalyst, it has been discovered that this invention may be practiced to effect the lamination of all woods.

Furthermore, the presence of methyl cellulose in the catalyst composition renders feasible the incorporation thereinto of wood flour, clay, and like solid fillers conventionally employed in the art. Also, the presence of the methyl cellulose in the catalyst composition of the present invention tends to increase the assembly-line tolerance of the catalyst composition whereby the tendency of the catalyst to migrate from the glue line or otherwise to be affected in such a manner as to prevent the formation of a strong glue bond is obviated. It is critical, however, that the methyl cellulose be present in the catalyst composition of this invention within the aforementioned limits of concentration and viscosity.

The urea-formaldehyde resin adhesives, as a class, are suitable for the purposes of the present invention. Preferred are those resinous products resulting from the reaction of urea and formaldehyde in a mole ratio of from about 1:1 to about 1:2, in the presence of a catalyst, until the reaction product has reached an intermediate state of condensation such that upon dilution of the reaction mixture with water the condensation product is precipitated. Such resinous products are preferably utilized in the form of aqueous dispersions containing about 50% to 80% by weight of the urea-formaldehyde resins.

The maleic acid catalyst compositions of the present invention may suitably be prepared by dissolving maleic anhydride or maleic acid in water, followed by the addition thereto of the methyl cellulose. In a preferred embodiment, maleic anhydride is first dissolved in water having a temperature of about 100° F. to about 180° F., to form a solution containing about 40% to about 60% by weight of maleic acid. This concentrated solution is then diluted to form a solution containing about 30% to about 40% by weight of maleic acid, which may be shipped as a catalyst concentrate, and ultimately diluted to produce a final catalyst composition containing maleic acid in the above-defined critical range of about 10% to about 20% by weight. Methyl cellulose may be added to either the catalyst concentrate or to the final catalyst composition. If the methyl cellulose is added to the catalyst concentrate, it is appropriately incorporated in an amount such that the composition contains from about 0.4% to about 2% of methyl cellulose. The final catalyst composition, in any event, should contain from about 0.2% to about 2.0% of methyl cellulose as hereinbefore specified.

The methyl cellulose dispersion utilized may suitably be prepared by stirring commercial methyl cellulose in warm water having a temperature of about 140° F. to about 160° F. to form a mixture containing from about 5 to about 15% by weight of methyl cellulose, permitting the mixture so formed to swell for a few hours, preferably about 2 to 6 hours, and thereafter diluting the product so obtained. It is not essential that the methyl cellulose be completely dissolved before incorporation into the maleic acid solution.

Commercially, the present invention may be utilized by the application to one of the wood surfaces to be bonded of a urea-formaldehyde resin adhesive composition containing no catalyst, and the application to the opposing surface to be bonded of a maleic acid catalyst composition of the type described herein. The so-coated surfaces are thereafter placed in contact and clamped at room temperature, i. e., a temperature of from about 60° F. to about 80° F., for a period of from about 10 to about 30 minutes. In the course of this clamping operation the adhesive forms a bond of requisite strength to permit removal of the laminated product from the press. The bond becomes stronger and cures with the passage of time.

The following examples are illustrative of the practice of this invention:

Example 1

This example is illustrative of the best mode known to applicant for the preparation of the catalyst compositions of this invention. 104 lbs. of maleic anhydride are placed in a 50 gallon container, and approximately 8 gallons of water, at a temperature of approximately 108° F., are added rapidly to the maleic anhydride in the container, and the mixture stirred with a wooden paddle until all of the solids are dissolved. Cold water is then added in an amount sufficient to produce an ultimate solution containing about 20% by weight of maleic acid. The ultimate strength of the maleic acid catalyst solution so obtained may, of course, be varied by varying the amount of cold water added to the hot aqueous solution produced.

Example 2

This example is illustrative of the preparation of a catalyst composition of this invention containing methyl cellulose.

104 lbs. of maleic anhydride are placed in a 50 gallon container. Approximately 8 gallons of water, at a temperature of about 108° F., are added rapidly to the maleic anhydride, and the mixture stirred for a time requisite to effect solution of all of the solids present. Cold water is then added, with agitation, in an amount requisite to form an ultimate solution having a total weight of 300 lbs.

About 4 lbs of methyl cellulose, in about 8 gallons of water are then added, with agitation, to the maleic acid solution previously formed, the product thereby obtained diluted with cold water until the total weight thereof is 800 lbs. The methyl cellulose utilized was characterized by a viscosity in 2% aqueous solution at 20° C. of about 1,500 centipoises, specific viscosity.

The methyl cellulose dispersion utilized was prepared by stirring 5 lbs. of the methyl cellulose into about 10 gallons of water at a temperature of about 160° F. The mixture so formed was permitted to swell for a few hours and then diluted to an ultimate volume of 20 gallons, such that 2 gallons of the dispersion contained about 0.5 lb. of methyl cellulose.

It will be appreciated by those skilled in the art, that the concentration of methyl cellulose in the catalyst solutions of this invention may be varied by varying the amount of methyl cellulose dispersion added thereto.

Example 3

Blocks of hard maple, western white pine, red gum, and white oak, having the dimensions ¾"×2½"×12" were utilized. The blocks were bonded together with urea-formaldehyde resin adhesives set by the catalysts of this invention. In each case, one surface of the surfaces to be joined was coated with an aqueous dispersion containing about 66% by weight of a urea-formaldehyde resin adhesive, and the other of the surfaces to be joined was coated with a catalyst composition of the type embraced by this invention, containing maleic acid in the proportions indicated in Table IV. The so-coated surfaces are thereafter placed in clamps under pressure of about 250 lbs., at a temperature of about 70° F., for a period of 10 minutes. The so-bonded blocks were tested immediately in a Baldwin-Southwark testing apparatus of the type described with reference to Table II. The urea-formaldehyde resin adhesive employed was of the same type as that described in Table I. The data recorded in Table IV are average results obtained by testing five such bonded blocks.

TABLE IV

| Species | Percent by Weight of Maleic Acid | Average Sheer Stress, p. s. i. | Average Wood Failure, Percent |
|---|---|---|---|
| Hard maple | 10 | 379 | 0 |
| Do | 13 | 487 | 0 |
| Do | 15 | 541 | 0 |
| Western white pine | 10 | 228 | 0 |
| Do | 10 | 229 | 0 |
| Do | 13 | 281 | 0 |
| Do | 15 | 361 | 0 |
| Red gum | 10 | 52 | 0 |
| Do | 10 | 121 | 0 |
| Do | 13 | 314 | 0 |
| White oak | 10 | 261 | 0 |
| Do | 10 | 273 | 0 |
| Do | 13 | 304 | 0 |
| Do | 15 | 474 | 0 |
| Do | 20 | 520 | 10 |

Example 4

The series of tests described in Example 3 were repeated with the exception that in this instance the tests were delayed until seven days subsequent to the initial gluing operation.

TABLE V

| Species | Catalyst | Average Shear Stress, p. s. i. | Average Wood Failure, Percent |
|---|---|---|---|
| Hard maple | 10 | 3,395 | 84 |
| Do | 10 | 3,394 | 100 |
| Do | 13 | 3,669 | 92 |
| Western white pine | 15 | 1,256 | 95 |
| Do | 10 | 1,195 | 97 |
| Do | 13 | 1,106 | 61 |
| Red gum | 15 | 1,208 | 29 |
| Do | 10 | 699 | 26 |
| Do | 10 | 1,276 | 52 |
| White oak | 15 | 1,732 | 56 |
| Do | 10 | 2,055 | 65 |
| Do | 15 | 1,925 | 55 |
| Do | 10 | 1,932 | 64 |
| Do | 20 | 2,075 | 72 |

From a comparison of Tables IV and V, it is apparent that the strength of the bond formed by the methods of this invention increases rapidly with the passage of time, and that the catalyst utilized does not adversely affect the strength of the wood adjacent the glue line. It is further evident from an examination of Table IV that the glue bond between the blocks is of sufficient strength after 10 minutes clamping to permit removal of the laminated product from the clamps and handling or storage thereof.

Example 5

The method of this invention is not restricted to the lamination of wood laminae, but may be utilized with equal effectiveness to bond plastic materials, glass, and the like, to wood. For example, the method described in Examples 3 and 4 may be utilized to bond plastic materials such as melamine formaldehyde resins, polystyrene, glass, and the like, to wood. In a particular embodiment, a sheet of melamine formaldehyde resin was coated with a catalyst composition containing about 15% of maleic acid and about 0.5% of methyl cellulose in water, and a surface of a Douglas fir block having the dimensions of ¾"×2½"×12" was coated with an aqueous dispersion of a urea-formaldehyde resin adhesive of the type described in Example 3. The laminate so formed was placed in clamps under a pressure of about 40 lbs. per square inch at a temperature of about 70° F. for a period of about 20 minutes. A satisfactory laminate was produced.

When the process of this invention is utilized to bond resinous materials to wood, the laminates are preferably subjected to a pressure of about 20 to about 100 lbs. per square inch in the bonding operation.

I claim:

1. A catalyst for cold-setting urea-formaldehyde resin adhesives consisting essentially of an aqueous solution containing from about 10% to about 20% by weight of maleic acid, there being present in said solution methyl cellulose in an amount equal to from about 0.2% to about 2.0% of the weight thereof.

2. A catalyst concentrate consisting essentially of an aqueous solution containing from about 20% to about 40% by weight of maleic acid, there being present in said solution methyl cellulose in an amount equal to from about 0.4% to about 2% by weight thereof.

3. The method of preparing a catalyst for cold-setting urea-formaldehyde resin adhesives which consists essentially of dissolving maleic anhydride in water maintained at a temperature of from about 100° F. to about 180° F. in an amount requisite to form a first solution containing from about 40% to about 60% by weight of maleic acid; thereafter diluting said solution to form a second solution containing from about 10% to about 40% by weight of maleic acid, and thereafter incorporating into said second solution a mixture of methyl cellulose and water, said mixture containing from about 5% to about 15% by weight of methyl cellulose and being prepared by stirring methyl cellulose into water maintained at a temperature of from about 140° F. to about 160° F. and thereafter permitting the composition so formed to stand for a period of about 2 to 6 hours, the amount of said mixture added to said second solution being such that the ultimate composition produced contains from about 0.2% to about 2% by weight of methyl cellulose.

4. The process which comprises converting, at room temperature in a time period of not more than about 10 to 30 minutes, a urea-formaldehyde resin adhesive to a solid, strongly coherent body, by applying as a cold setting catalyst to said adhesive an aqueous solution containing from 7.6% to about 20% by weight of maleic acid, said catalyst being employed in an amount sufficient to provide at least about 1.5 parts of maleic acid for each 100 parts by weight of urea-formaldehyde resin in said adhesive.

References Cited in the file of this patent

UNITED STATES PATENTS

| Number | Name | Date |
|---|---|---|
| 1,922,690 | Lougovoy | Aug. 15, 1933 |
| 2,453,608 | West | Nov. 9, 1948 |

FOREIGN PATENTS

| Number | Country | Date |
|---|---|---|
| 281,717 | Great Britain | Apr. 5, 1929 |
| 435,041 | Great Britain | Sept. 12, 1935 |